US009363693B2

(12) United States Patent
Fukuta (10) Patent No.: US 9,363,693 B2
(45) Date of Patent: *Jun. 7, 2016

(54) RADIO MEASUREMENT COLLECTION METHOD, RADIO TERMINAL, AND RADIO BASE STATION

(75) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 175 days.

This patent is subject to a terminal disclaimer.

(21) Appl. No.: 13/879,262

(22) PCT Filed: Sep. 22, 2011

(86) PCT No.: PCT/JP2011/071735
§ 371 (c)(1),
(2), (4) Date: Apr. 12, 2013

(87) PCT Pub. No.: WO2012/049957
PCT Pub. Date: Apr. 19, 2012

(65) Prior Publication Data
US 2013/0208617 A1    Aug. 15, 2013

(30) Foreign Application Priority Data
Oct. 13, 2010   (JP) .................................. 2010-231003

(51) Int. Cl.
*H04L 1/00*       (2006.01)
*H04W 24/08*      (2009.01)
(Continued)

(52) U.S. Cl.
CPC .............. *H04W 24/08* (2013.01); *H04W 24/10* (2013.01); *H04W 16/18* (2013.01)

(58) Field of Classification Search
CPC .................................................. H04W 24/08

USPC ......................................................... 370/252
See application file for complete search history.

(56) References Cited

U.S. PATENT DOCUMENTS

2008/0045255 A1*  2/2008  Revel ................... H04L 1/1812
                                                        455/510
2010/0190488 A1   7/2010  Jung et al.
(Continued)

FOREIGN PATENT DOCUMENTS

WO    2010/087625 A2    8/2010
WO    2012/043307 A1    4/2012

OTHER PUBLICATIONS

An Office Action issued by the Korean Patent Office on Jun. 27, 2014, which corresponds to Korean Patent Application No. 10-2013-7009664 and is related to U.S. Appl. No. 13/879,262; with English language statement of relevance.
(Continued)

*Primary Examiner* — Derrick Ferris
*Assistant Examiner* — Faisal Choudhury
(74) *Attorney, Agent, or Firm* — Studebaker & Brackett PC (57) ABSTRACT

In one embodiment, a radio measurement collection method comprises: a step S11 of transmitting, by a E-UTRAN, a MDT Configuration message including a measurement trigger to the radio terminal UE; a step S14 of setting, by the radio terminal UE, the measurement trigger included in the MDT Configuration message received from the E-UTRAN in the radio terminal, and then performing radio environment measurement when an event corresponding to the measurement trigger occurs in an idle state and recording measurement data including a result of the measurement and location information; a step of S16 of transmitting, by the radio terminal UE, trigger type information indicating the measurement trigger to the E-UTRAN when the radio terminal UE is transitioned to a connected state from the idle state; and a step S17 of determining, by the E-UTRAN, whether to request the radio terminal UE to transmit the measurement data on the basis of the trigger type information from the radio terminal UE.

11 Claims, 3 Drawing Sheets

(51) Int. Cl.
*H04W 24/10* (2009.01)
*H04W 16/18* (2009.01)

(56) References Cited

U.S. PATENT DOCUMENTS

| | | | |
|---|---|---|---|
| 2010/0208707 A1* | 8/2010 | Hamabe et al. | 370/332 |
| 2011/0183661 A1* | 7/2011 | Yi et al. | 455/422.1 |
| 2011/0195668 A1* | 8/2011 | Lee et al. | 455/67.11 |
| 2012/0269172 A1* | 10/2012 | Chin | H04W 36/32 370/332 |
| 2013/0170362 A1 | 7/2013 | Futaki et al. | |
| 2013/0178216 A1* | 7/2013 | Chang et al. | 455/437 |
| 2013/0178224 A1* | 7/2013 | Chang et al. | 455/452.1 |
| 2013/0183979 A1* | 7/2013 | Chen | H04W 36/30 455/436 |
| 2013/0242830 A1* | 9/2013 | Lee | H04W 72/1215 370/311 |

OTHER PUBLICATIONS

3GPP; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; 3GPP TS 37.320; V1.0.0; Aug. 2010.

NTT DOCOMO, Inc.; "Event triggered logged MDT measurement"; 3GPP TSG-RAN2 Meeting #71; R2-104666; Madrid, Spain; Aug. 23-27, 2010.

An Office Action; "Notice of Reasons for Rejection," issued by the Japanese Patent Office on Nov. 11, 2014, which corresponds to Japanese Patent Application No. 2014-021281 and is related to U.S. Appl. No. 13/879,262; with English language statement of relevance.

Samsung; "Idle mode MDT measurements, flows"; 3GPP TSG-RAN2#70 bis meeting; R2-103790; Jun. 28-Jul. 2, 2010; Stockholm, Sweden.

3GPP TR 36.805 V9.0.0 (Dec. 2009) Technical Report; 3rd Generation Partnership Project; Technical Specification Group Radio Access Network; Study on Minimization of drive-tests in Next Generation Networks; (Release 9).

3GPP TS 37.320 V0.7.0 (Jun. 2010) Technical Specification 3rd Generation Partnership Project; Technical Specification Group TSG RAN; Universal Terrestrial Radio Access (UTRA) and Evolved; Universal Terrestrial Radio Access (EUTRA); Radio measurement collection for Minimization of Drive Tests (MDT); Overall description; Stage 2 (Release 10).

3GPP TSG-RAN WG2 meeting #67 R2-094291 Agenda item 4.2.2; Email discussion summary [66b#7] LTE-UMTS: Minimisation of drive tests; Qualcomm Europe; Shenzhen, China, Aug. 24-28, 2009.

3GPP TS 36.331 V9.4.0 (Sep. 2010) Technical Specification; 3rd Generation Partnership Project; Technical Specification Group Radio Access Network; Evolved Universal Terrestrial Radio Access (E-UTRA); Radio Resource Control (RRC); Protocol Specification (Release 9).

International Search Report and the Written Opinion dated Nov. 15, 2011, which corresponds to PCT/JP2011/071735.

* cited by examiner

FIG. 1

RADIO MEASUREMENT COLLECTION METHOD, RADIO TERMINAL, AND RADIO BASE STATION

TECHNICAL FIELD

The present invention relates to a radio measurement collection method, a radio terminal, and a radio base station by which it is possible to measure a radio environment and collect a measurement result and location information.

BACKGROUND ART

In case of mobile communication systems, if a building is constructed on the periphery of a radio base station and if the installation situation of the base stations on the periphery of the radio base station changes, then the radio environment related to this radio base station changes. Therefore, conventionally, an operator performs a drive test of measuring a radio environment using a measurement vehicle provided with a measurement equipment, and collecting a measurement result and location information.

Such measurement and collection, for example, may contribute to the optimization of the coverage of a radio base station, but face the problem of too many man-hours and high cost. In this regard, according to 3GPP (3rd Generation Partnership Project) which is a project aiming to standardize a mobile communication system, a radio terminal owned by a user is used to proceed with the specification design of MDT (Minimization of Drive Test) for automation of the measurement and collection (refer to Non Patent Literatures 1 and 2).

As a type of the MDT, there is a record-type MDT (hereinafter, appropriately Logged MDT). According to the Logged MDT, a radio terminal in an idle state performs radio environment measurement according to a measurement parameter (a measurement condition) set from a network, records a measurement result as measurement data together with location information and time information, and reports the recorded measurement data to the network later.

PRIOR ART DOCUMENT

Non-Patent Document

Non-patent Document 1: 3GPP TR 36.805 V9.0.0 "Study on Minimization of drive-tests in Next Generation Networks", 2009-12

Non-patent Document 2: 3GPP TS 37.320V0.7.0, "Radio measurement collection for Minimization of Drive Tests (MDT)", 2010-07

SUMMARY OF THE INVENTION

In the record-type MDT, since a plurality of radio terminals perform measurement under various conditions, it is considered that there are measurement data important for a network and measurement data not important. However, in the radio measurement collection method, since all types of measurement data are handled in the same manner, it is probable that it is not possible for the network (that is, an operator) to sufficiently collect important measurement data.

Therefore, an object of the present invention is to provide a radio measurement collection method, a radio terminal, and a radio base station by which it is possible for a network to easily collect important measurement data in record-type MDT.

The present invention has the following features to solve the problems described above. Firstly, a feature of the radio measurement collection method of the present invention is summarized as follows. A radio measurement collection method comprises: a step (a step S11) of transmitting, by a network (an E-UTRAN) including a radio base station (a radio base station eNB), a setup message (an MDT Configuration message) including a measurement trigger to a radio terminal (a radio terminal UE); step (a step S14) of setting, by the radio terminal, the measurement trigger included in the setup message received from the network in the radio terminal, and then performing radio environment measurement in response to the measurement trigger and recording measurement data including a result of the measurement and location information in an idle state; and a step (a step S16) of transmitting, by the radio terminal, trigger type information indicating a type of the measurement trigger to the network.

Another feature of the radio measurement collection method of the present invention is summarized as follows. In the radio measurement collection method of the above feature, in the step of transmitting the trigger type information, the radio terminal transmits the trigger type information to the network when the radio terminal is transitioned to a connected state from the idle state.

Another feature of the radio measurement collection method of the present invention is summarized as follows. In the radio measurement collection method of the above feature, in the step of transmitting the trigger type information, the radio terminal transmits the trigger type information together with holding information (Availability Indicator) indicating that the measurement data has been held.

Another feature of the radio measurement collection method of the present invention is summarized as follows. In the radio measurement collection method of the above feature, in the step of transmitting the trigger type information, the radio terminal transmits the trigger type information to the network in response to reception of a request message (an UE Information Request message) for requesting transmission of the measurement data from the network.

Another feature of the radio measurement collection method of the present invention is summarized as follows. In the radio measurement collection method of the above feature, the radio measurement collection method further comprises: a step of determining, by the network, whether to request the radio terminal to transmit the measurement data on the basis of the trigger type information from the radio terminal.

Another feature of the radio measurement collection method of the present invention is summarized as follows. In the radio measurement collection method of the above feature, the radio measurement collection method further comprises: a step of transmitting, by the network, a request message (an UE Information Request message) for requesting transmission of the measurement data to the radio terminal when it is determined to request the transmission of the measurement data in the step of determining.

A feature of the radio terminal of the present invention is summarized as follows. A radio terminal comprising: a terminal-side reception unit (a radio communication unit 210) that receives a setup message (an MDT Configuration message) including a measurement trigger from a network (an E-UTRAN) including a radio base station (a radio base station eNB); a measurement recording unit (a measurement recording unit 261) that sets, to the radio terminal, the measurement trigger included in the setup message received in the reception unit, and then performs radio environment measurement in response to the measurement trigger and records measurement data including a result of the measurement and location information in an idle state; and a terminal-side transmission unit (a report processing unit 262 and the radio communication unit 210) that transmits trigger type information indicating a type of the measurement trigger to the network.

Another feature of the radio terminal of the present invention is summarized as follows. In the radio terminal of the above feature, when the radio terminal is transitioned to a connected state from the idle state, the terminal-side transmission unit transmits the trigger type information together with holding information indicating that the measurement data has been held.

Another feature of the radio terminal of the present invention is summarized as follows. In the radio terminal of the above feature, the terminal-side transmission unit transmits the trigger type information together with holding information (Availability Indicator) indicating that the measurement data has been held.

Another feature of the radio terminal of the present invention is summarized as follows. In the radio terminal of the above feature, the terminal-side transmission unit transmits the trigger type information to the network in response to reception of a request message for requesting transmission of the measurement data in the terminal-side reception unit.

A feature of the radio base station of the present invention is summarized as follows. A radio base station comprises: a base station-side reception unit (a radio communication unit 110) that receives, from a radio terminal (a radio terminal UE), trigger type information indicating a measurement trigger that is set in the radio terminal and is a trigger by which the radio terminal performs radio environment measurement in an idle state.

Another feature of the radio base station of the present invention is summarized as follows. In the radio base station of the above feature, the radio base station further comprises: a determination unit (a collection control unit 142) that determines whether to request the radio terminal to transmit measurement data including a measurement result of the radio environment and location information on the basis of the trigger type information received in the base station-side reception unit.

Another feature of the radio base station of the present invention is summarized as follows. In the radio base station of the above feature, the radio base station further comprises: a base station-side transmission unit (a collection control unit 142 and a radio communication unit 110) that transmits a request message for requesting transmission of the measurement data to the radio terminal when it is determined to request the transmission of the measurement data.

DESCRIPTION OF THE EMBODIMENT

With reference to the accompanying drawings, an embodiment of the present invention will be described in the sequence of (1) Overview of mobile communication system, (2) Configuration of radio base station, (3) Configuration of ratio terminal, (4) Radio measurement collection method, (5) Effect of embodiment, and (6) Other embodiments. It is to be noted that the same or similar reference numerals are applied to the same or similar parts through the drawings in the following embodiments.

A radio measurement collection method according to the present embodiment includes: a step of transmitting, by a network including a radio base station, a setup message including a measurement trigger to a radio terminal; a step of setting, by the radio terminal, the measurement trigger included in the setup message received from the network in the radio terminal, and then performing radio environment measurement when an event corresponding to the measurement trigger occurs in an idle state and recording measurement data including a result of the measurement and location information; a step of transmitting, by the radio terminal, trigger type information indicating the measurement trigger to the network when the radio terminal is transitioned to a connected state from the idle state; and a step of determining, by the network, whether to request the radio terminal to transmit the measurement data on the basis of the trigger type information from the radio terminal.

Hereinafter, a mobile communication system configured on the basis of LTE (Long Term Evolution)—Advanced with specifications designed by 3GPP is exemplified. Furthermore, E-UTRAN is exemplified as the network and an MDT Configuration message is exemplified as a setup message.

(1) Overview of Mobile Communication System

Figure 1:
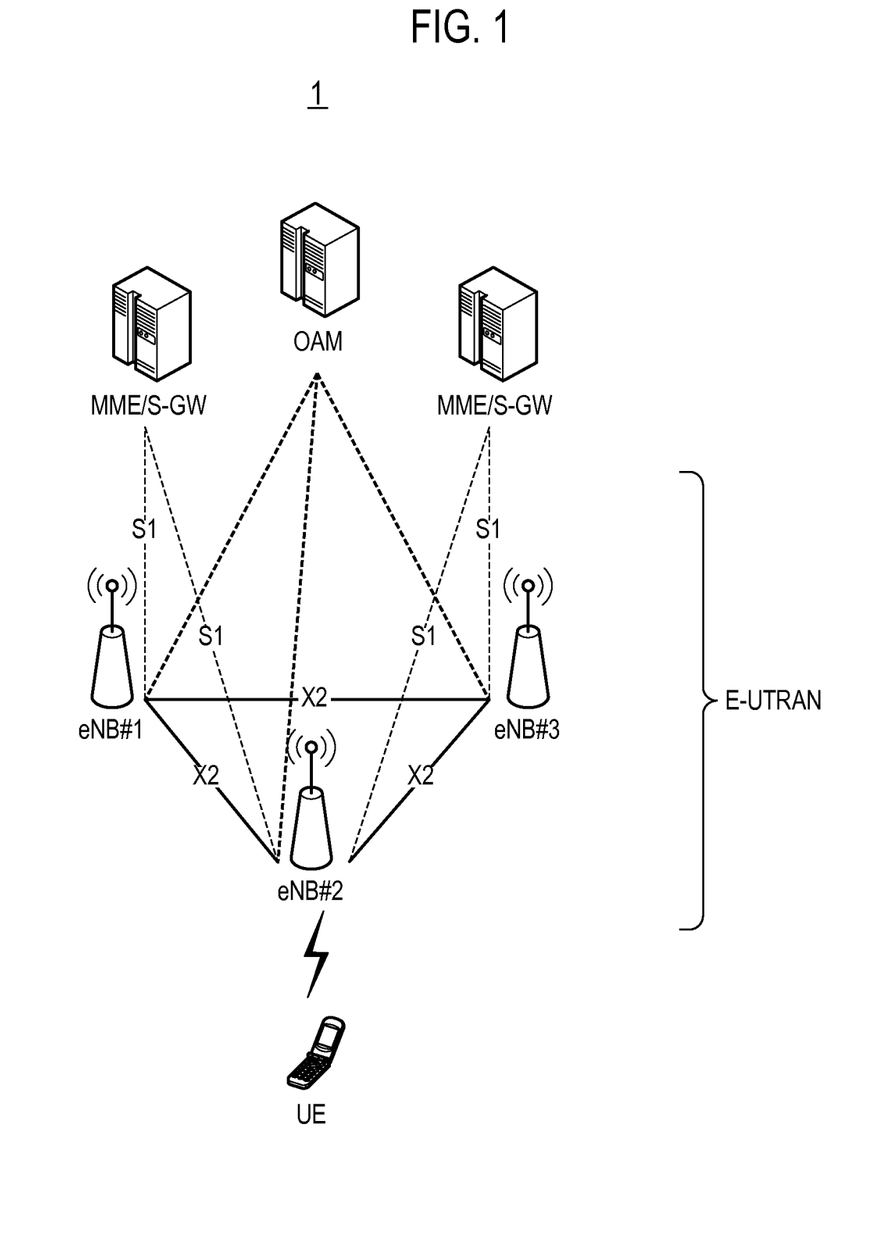
FIG. 1 is a diagram illustrating an entire schematic configuration of a mobile communication system according to an embodiment of the present invention.

FIG. 1 is a diagram illustrating an entire schematic configuration of a mobile communication system 1 according to the present embodiment.

As illustrated in FIG. 1, the mobile communication system 1 includes a radio terminal UE (User Equipment), a radio base station eNB (evolved Node-B), an operation and maintenance device OAM (Operation and Maintenance), and a mobility management device MME (Mobility Management Entity)/a gateway device S-GW (Serving Gateway).

The plurality of radio base stations eNB (eNB#1 to eNB#3) constitute E-UTRAN (Evolved-UMTS Terrestrial Radio Access Network). Each of the plurality of radio base stations eNB manages a cell that is a communication area where a service should be provided to the radio terminal UE. The radio terminal UE is a radio communication device owned by a user.

Each of the adjacent radio base stations eNB can communicate mutually via an X2 interface which is a logical communication channel to provide communication between the base stations. Each of the plurality of radio base stations eNB can communicate with EPC (Evolved Packet Core), specifically, the MME/S-GW via an S1 interface. Furthermore, the radio base station eNB can communicate with the operation and maintenance device OAM operated by the operator.

The mobile communication system 1 supports record-type MDT (called as Logged MDT). According to the record-type MDT, a radio terminal UE in an idle state performs measurement when a preset condition is satisfied, and holds measurement data including a measurement result in order to report the measurement data to a network later. A radio environment is measured and collected under the record-type MDT as follows:

Firstly, the E-UTRAN transmits an MDT Configuration message, which is a setup message for setting a measurement parameter, to a radio terminal UE in a connected state. The measurement parameter includes a measurement object (measurements to be logged), a measurement trigger (triggering of logging event), a measurement duration (total duration of logging), an absolute time (network absolute time stamp), and a measurement area. However, the measurement area may not be included in the measurement parameter. In addition, the measurement parameter may be called as MDT Configuration.

The measurement object, for example, indicates a frequency band to be measured, and the radio terminal UE measures reference signal received power (RSRP) or reference signal received quality (RSRQ) with respect to the frequency band that is to be measured.

The measurement trigger, for example, indicates a periodical downlink pilot signal strength measurement trigger, and a measurement interval may be set in this area. The radio terminal UE performs measurement at a preset measurement interval.

However, as well as such a periodical measurement trigger, the following event trigger-type measurement trigger may be set. Hereinafter, overview of event trigger-type measurement triggers will be described. Refer to Non Patent Literature 1 for details of the measurement triggers.

A trigger indicating that a radio environment of a serving cell becomes less than a threshold value. The trigger type is suitable for coverage optimization, specifically, for designating the location at which downlink problem occurs.

A trigger indicating that a random access process is failed. The trigger type is suitable for designating a factor of the random access failure.

A trigger indicating that decoding of a paging channel is failed. The trigger type is suitable for recognizing whether reliable paging information is received in a radio terminal in an idle state.

A trigger indicating that decoding of a broadcast channel is failed. The trigger type is suitable for designating a radio environment or a location when a radio terminal in an idle state is not able to camp (stand by).

In addition, the measurement duration is for setting a duration of the record-type MDT, and the absolute time is for setting a reference of time information (a time stamp) generated by the radio terminal UE.

The measurement area is for setting an area to be measured by the radio terminal UE.

Secondly, the radio terminal UE performs radio environment measurement when the radio terminal UE is in an idle state and a condition corresponding to a preset measurement trigger is satisfied in a measurement duration, and records measurement data including a measurement result. The radio terminal UE activates a measurement duration timer when a measurement parameter is set by the MDT Configuration message, and ends the recording of the measurement data when the timer expires. In addition, the radio environment, for example, includes RSRP or RSRQ. Furthermore, the measurement data includes location information and a time stamp (time information), in addition to the measurement result. The location information includes ECGI (E-UTRAN Cell Global Identifier) of a serving cell. Furthermore, when the radio terminal UE has a positioning function, the location information further includes GNSS (Global Navigation Satellite System) location information. Meanwhile, when the radio terminal UE has no positioning function, the location information further includes an RF (Radio frequency) fingerprint related to a reception state from a neighboring cell.

Thirdly, when the radio terminal UE is transitioned from an idle state (RRC Idle state) to a connected state (RRC Connected state), the radio terminal UE transmits, to the E-UTRAN, holding information (called as Availability Indicator) indicating that the measurement data has been held. Specifically, the radio terminal UE allows the holding information to be included in an RRCConnectionSetupComplete message for completing the setup of the connected state, and transmits the RRCConnectionSetupComplete message to the E-UTRAN.

In the present embodiment, the radio terminal UE allows trigger type information indicating a preset measurement trigger as well as the holding information to be included in the RRCConnectionSetupComplete message, and transmits the RRCConnectionSetupComplete message to the E-UTRAN. Furthermore, an example of the trigger type information is as follows.

Information representing a periodical trigger.
Information representing an area-based trigger.
Information representing a trigger indicating that a radio environment of a serving cell becomes less than a threshold value.
Information representing a trigger indicating that a random access process is failed.
Information representing a trigger indicating that decoding of a paging channel is failed.
Information representing a trigger indicating that decoding of a broadcast channel is failed.

Fourthly, the E-UTRAN determines whether to request the radio terminal UE to transmit the measurement data on the basis of the received holding information and trigger type information. When it is determined to request the transmission of the measurement data, the E-UTRAN transmits a UEInformationRequest message, which is a message for requesting the transmission of the measurement data, to the radio terminal UE. When the UEInformationRequest message is received, the radio terminal UE transmits a UEInformationResponse message including the held measurement data to the E-UTRAN.

(2) Configuration of Radio Base Station

Figure 2:
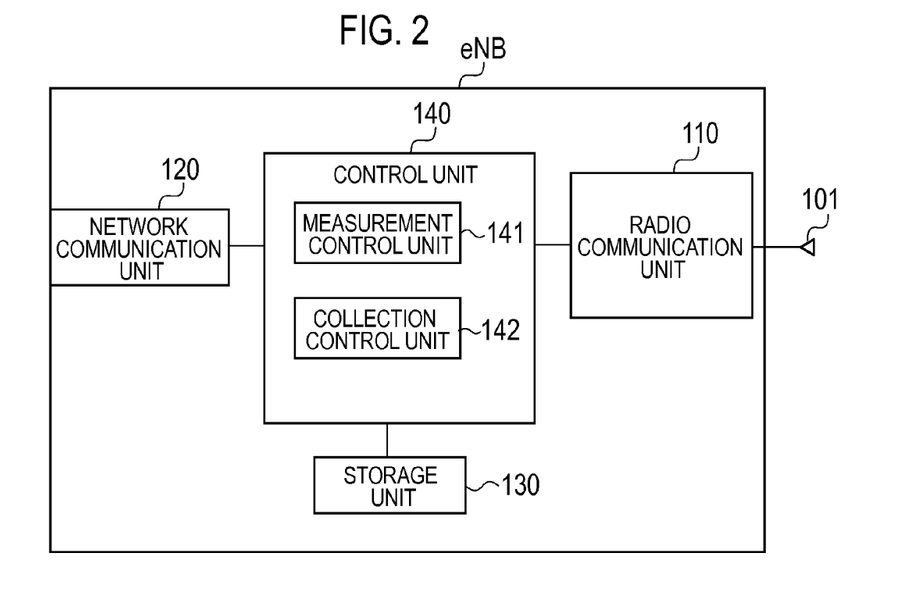
FIG. 2 is a block diagram illustrating a configuration of a radio base station according to the embodiment of the present invention.

FIG. 2 is a block diagram illustrating a configuration of the radio base station eNB.

As shown in FIG. 2, the radio base station eNB includes an antenna 101, a radio communication unit 110, a network communication unit 120, a storage unit 130, and a control unit 140.

The antenna 101 is used for transmitting and receiving a radio signal. The radio communication unit 110 is configured by using a radio frequency (RF) circuit and a base band (BB) circuit, for example, and transmits and receives a radio signal via the antenna 101. Furthermore, the radio communication unit 110 performs modulation of a transmission signal and demodulation of a reception signal. The network communication unit 120 is configured to perform communication with other network devices (such as the operation and maintenance device OAM and other radio base stations eNB). The storage unit 130 is configured by using a memory, for example, and stores various types of information used for controlling the radio base station eNB, for example. The control unit 140 is configured by using, for example, a CPU, and controls various functions provided in the radio base stations eNB.

The control unit 140 has a measurement control unit 141 and a collection control unit 142.

The measurement control unit 141 performs control for setting the measurement parameter (the measurement object, the measurement trigger, the measurement duration, the absolute time, and the measurement area) in the radio terminal UE. Specifically, when it is determined to set the measurement parameter in the radio terminal UE (selected by the network), the measurement control unit 141 generates an MDT Configuration message including the measurement parameter.

Then, the measurement control unit 141 controls the radio communication unit 110 such that the MDT Configuration message is transmitted to the radio terminal UE.

The collection control unit 142 performs control for collecting the measurement data from the radio terminal UE. Specifically, when the radio communication unit 110 receives the RRCConnectionSetupComplete message including the holding information (Availability Indicator) and the trigger type information from the radio terminal UE, the collection control unit 142 determines whether to request the radio terminal UE to transmit the measurement data on the basis of these types of information.

As described above, in the present embodiment, the radio communication unit 110 corresponds to a base station-side reception unit that receives trigger type information, which indicates the type of the measurement trigger set in the radio terminal UE, from the radio terminal UE. Furthermore, in the present embodiment, the collection control unit 142 corresponds to a determination unit that determines whether to request the radio terminal UE to transmit the measurement data including the measurement result of the radio environment and the location information.

The collection control unit 142 determines whether to request the radio terminal UE to transmit the measurement data according to a determination reference determined in advance. For example, the collection control unit 142 determines whether to request the radio terminal UE to transmit the measurement data such that event trigger-type measurement triggers are more preferentially collected than a periodical trigger. The event trigger-type measurement trigger is used for the specific purpose because it has a relatively high importance. Furthermore, a priority may be assigned to the event trigger-type measurement triggers as follows. Specifically, the collection priority of an error related to an entire system and an error related to both an idle state and a connected state, for example, the collection priority of a trigger, which indicates that decoding of a broadcast channel is failed, is set to be high. Next, the collection priority of an error related to the entire system and an error related to the idle state, for example, the collection priority of a trigger, which indicates that decoding of a paging channel (PDCCH) is failed, is set to be high. The collection priority of an error specific to the terminal, for example, the collection priority of a trigger, which indicates that a radio environment of a serving cell becomes less than a threshold value, is set to be low.

Alternatively, the collection control unit 142 may determine whether to request the radio terminal UE to transmit the measurement data according to a determination reference set from the operation and maintenance device OAM. Specifically, in the case in which the operation and maintenance device OAM has instructed to collect measurement data for a specific measurement trigger, when trigger type information corresponding to the specific measurement trigger is notified from the radio terminal UE, the collection control unit 142 determines to request the radio terminal UE to transmit the measurement data. Furthermore, in the case in which the operation and maintenance device OAM has instructed to collect the measurement data for the specific measurement trigger, when trigger type information corresponding to a measurement trigger, other than the specific measurement trigger, is notified from the radio terminal UE, the collection control unit 142 determines not to request the radio terminal UE to transmit the measurement data.

When it is determined to request the transmission of the measurement data, the collection control unit 142 generates the UEInformationRequest message, and controls the radio communication unit 110 such that the generated UEInformationRequest message is transmitted to the radio terminal UE. As described above, in the present embodiment, the collection control unit 142 and the radio communication unit 110 configure a base station-side transmission unit that transmits a request message (UEInformationRequest) for requesting the transmission of the measurement data to the radio terminal UE.

When the radio communication unit 110 receives a UEInformationResponse message transmitted (reported) from the radio terminal UE in response to the UEInformationRequest message, the collection control unit 142 acquires the measurement data included in the received UEInformationResponse message. Then, the collection control unit 142 controls the network communication unit 120 such that the acquired measurement data is transmitted to the operation and maintenance device OAM. In addition, as well as the case in which the measurement data is transmitted to the operation and maintenance device OAM, the collection control unit 142 may interpret the content of the measurement data and use the measurement data in order to optimize a parameter of the radio base station eNB.

(3) Configuration of Radio Terminal

Figure 3:
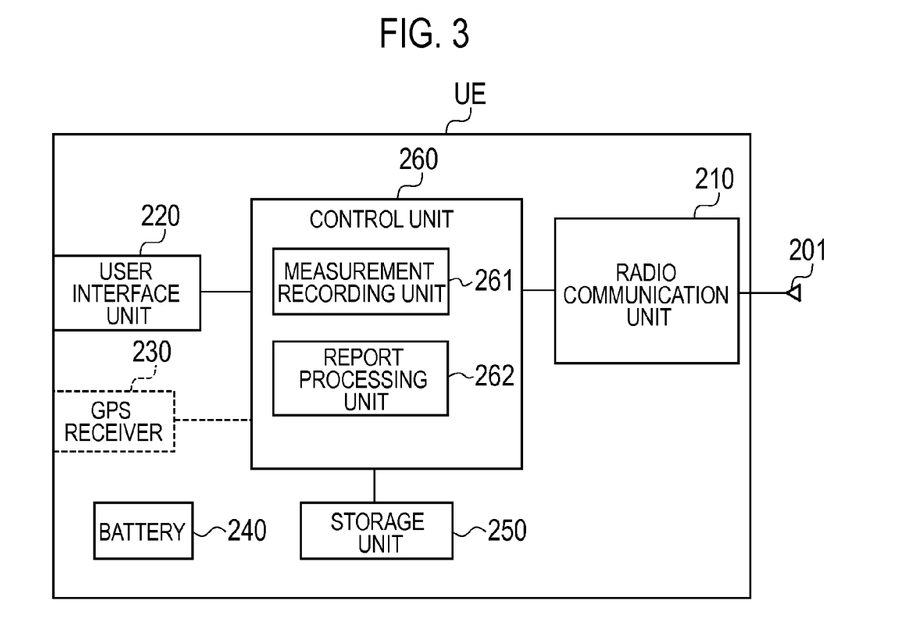
FIG. 3 is a block diagram illustrating a configuration of a radio terminal according to the embodiment of the present invention.

FIG. 3 is a block diagram illustrating a configuration of the radio terminal UE.

As shown in FIG. 3, the radio terminal UE includes an antenna 201, a radio communication unit 210, a user interface unit 220, a GPS receiver 230, a battery 240, a storage unit 250, and a control unit 260. However, the radio terminal UE need not include the GPS receiver 230.

The antenna 201 is used for transmitting and receiving radio signals. The radio communication unit 210 is configured by using a radio frequency (RF) circuit and a base band (BB) circuit, for example, and transmits and receives a radio signal via the antenna 201. Furthermore, the radio communication unit 210 performs modulation of a transmission signal and demodulation of a reception signal. The user interface unit 220 is a display, button, or the like that functions as an interface with the user. The battery 240 is configured to charge an electric power supplied to each block of the radio terminal UE. The storage unit 250 is configured by using a memory, for example, and stores different types of information used for controlling the radio terminal UE, for example. The control unit 260 is configured, for example, using a CPU, and controls various functions provided in the radio terminal UE.

The control unit 260 includes a measurement recording unit 261 and a report processing unit 262.

In the connected state, when the radio communication unit 210 receives the MDT Configuration message from the radio base station eNB, the measurement recording unit 261 sets the measurement parameter included in the received MDT Configuration message (that is, stores the measurement parameter in the storage unit 250). Furthermore, the measurement recording unit 261 activates the measurement duration timer (duration timer) at the time of setting of the measurement parameter.

In the present embodiment, the radio communication unit 210 corresponds to a terminal-side reception unit that receives a setup message (the MDT Configuration message) including the measurement trigger from the E-UTRAN including the radio base station eNB.

In the idle state, the measurement recording unit 261 performs radio environment measurement with respect to each measurement parameter stored in the storage unit 250 and acquirement of location information and time information (a time stamp), and records measurement data including the measurement result, the location information, and the time stamp (that is, stores the measurement data in the storage unit 250). The measurement recording unit 261 performs measurement with respect to a frequency band designated as a measurement object when an event corresponding to each measurement trigger (triggering of logging event) occurs.

As described above, the measurement recording unit 261 sets the measurement trigger, which is included in the MDT Configuration message received in the radio communication unit 210, in the radio terminal UE, and then performs radio environment measurement in response to the measurement trigger and records measurement data including a result of the measurement and location information in the idle state.

Furthermore, in the case in which a measurement area has been designated, the measurement recording unit 261 performs measurement only when the radio terminal UE camps (stands by) on a designated cell ID or a tracking area. Furthermore, the measurement recording unit 261 ends the recording of the measurement data when the measurement duration timer (duration timer) expires.

In addition, when the measurement duration timer (duration timer) expires, the measurement recording unit 261 removes a measurement parameter other than the measurement trigger. Details thereof will be described later. However, in the present embodiment, when the radio terminal UE is transitioned from the idle state to the connected state, since the radio terminal UE transmits trigger type information indicating the type of the measurement trigger to the network (the E-UTRAN), it is necessary to hold information on the measurement trigger without removing the information.

When the measurement parameter and the measurement data have been held, if a new setup message is received from the network and a new measurement parameter is set, the measurement recording unit 261 replaces the measurement parameter with the new measurement parameter, and removes the held measurement data.

In the case in which the storage unit 250 holds the measurement data, when the radio terminal UE is transitioned from the idle state to the connected state, the report processing unit 262 allows holding information indicating that the measurement data has been held and trigger type information indicating the type of the measurement trigger set in step S12 to be included in the RRCConnectionSetupComplete message for completing the transition to the connected state from the idle state, and controls the radio communication unit 210 such that the RRCConnectionSetupComplete message is transmitted.

In the present embodiment, the report processing unit 262 and the radio communication unit 210 configure a terminal-side transmission unit that transmits the trigger type information indicating the type of the measurement trigger to the network (the E-UTRAN) when the radio terminal UE is transitioned from the idle state to the connected state.

Moreover, in the connected state, when the radio communication unit 210 receives the UEInformationRequest message, the report processing unit 262 acquires the measurement data from the storage unit 250 and generates the UEInformationResponse message including the acquired measurement data. Then, the report processing unit 262 controls the radio communication unit 210 such that the generated UEInformationResponse message is transmitted to the E-UTRAN (the radio base station eNB). In this way, when the measurement data is reported to the network, the report processing unit 262 removes the measurement data stored in the storage unit 250.

(4) Radio Measurement Collection Method

Figure 4:
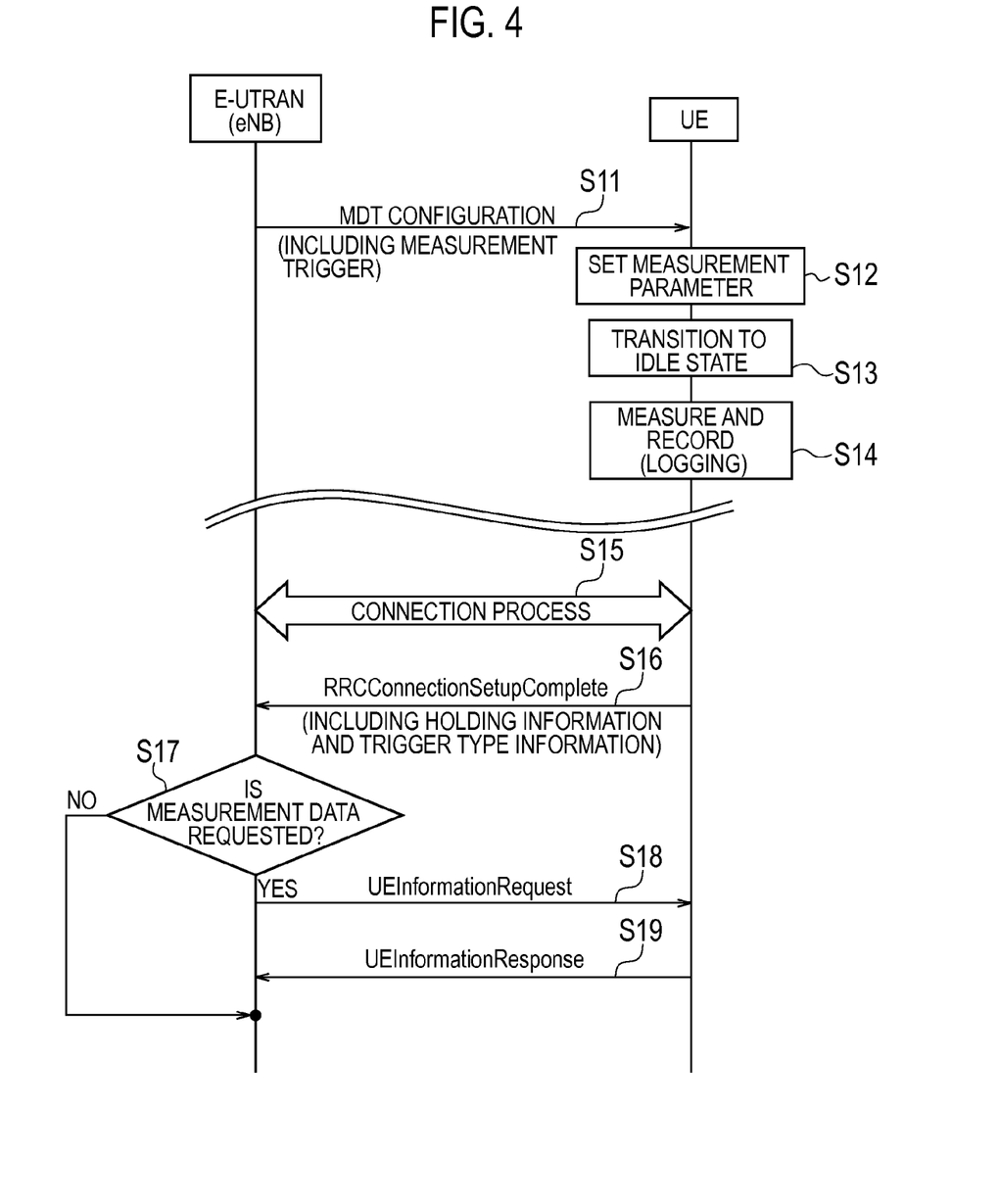
FIG. 4 is a sequence diagram illustrating a radio measurement collection method according to the embodiment of the present invention.

FIG. 4 is a sequence diagram illustrating the radio measurement collection method according to the present embodiment.

As illustrated in FIG. 4, in step S11, the radio base station eNB included in the E-UTRAN transmits an MDT Configuration message including a measurement parameter to the radio terminal UE in a connected state. The measurement parameter includes a measurement trigger. The radio terminal UE receives the MDT Configuration message.

In step S12, the radio terminal UE sets the measurement parameter included in the received MDT Configuration message in the radio terminal UE.

In step S13, the radio terminal UE is transitioned from the connected state to an idle state.

In step S14, the radio terminal UE performs radio environment measurement in response to the measurement parameter (including the measurement trigger), and records measurement data including a measurement result, location information, and a time stamp.

In step S15, the radio terminal UE performs a connection process with the radio base station eNB included in the E-UTRAN. In addition, it is highly probable that the radio base station eNB serving as a connection destination is different from a transmission source base station of the MDT Configuration message.

In step S16, the radio terminal UE transmits an RRCConnectionSetupComplete message including holding information (Availability Indicator) and trigger type information to the radio base station eNB. The radio base station eNB receives the RRCConnectionSetupComplete message. When the RRCConnectionSetupComplete message is normally received, the radio terminal UE is transitioned to the connected state from the idle state.

In step S17, the radio base station eNB determines whether to request the radio terminal UE to transmit the measurement data on the basis of the holding information and the trigger type information included in the RRCConnectionSetupComplete message received from the radio terminal UE. When it was determined to request the radio terminal UE to transmit the measurement data, the procedure proceeds to step S18.

In step S18, the radio base station eNB transmits a UEInformationRequest message to the radio terminal UE. The radio terminal UE receives the UEInformationRequest message.

In step S19, the radio terminal UE transmits a UEInformationResponse message including the measurement data to the radio base station eNB. When the UEInformationResponse message is received, the radio base station eNB transmits the acquired measurement data to the operation and maintenance device OAM. In addition, the radio base station eNB may interpret the content of the measurement data and may use the measurement data in order to optimize a parameter of the radio base station eNB.

(5) Effect of Embodiment

As described above, according to the present embodiment, the radio terminal UE transmits the trigger type information to the E-UTRAN, and the E-UTRAN determines whether to request the radio terminal UE to transmit the measurement data on the basis of the trigger type information. In this way, since the E-UTRAN is able to determine whether to request the transmission of the measurement data in consideration of a trigger when the radio terminal UE performed measurement, it is possible to determine important measurement data and unimportant measurement data, so that the E-UTRAN is able to easily collect the important measurement data in the record-type MDT.

Furthermore, in the present embodiment, the radio terminal UE transmits the trigger type information together with the holding information (Availability Indicator) indicating that the measurement data has been held. In this way, the E-UTRAN recognizes whether the radio terminal UE holds the measurement data, and then is able to determine whether to request the transmission of the measurement data.

Moreover, in the current MDT specifications, after the expiration of the duration timer indicating a duration in which measurement is performed by MDT, the radio terminal UE removes setup (Configuration) of all types of measurement data including trigger type information. However, in the present embodiment, after the expiration of the duration timer, the trigger type information is held without being removed. In this way, even after the expiration of the duration timer, the radio terminal UE is able to transmit the trigger type information to the E-UTRAN.

(6) Other Embodiments

Thus, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiment, the radio terminal UE transmits the trigger type information indicating the measurement trigger to the E-UTRAN together with the holding information (Availability Indicator). However, as well as the case in which the trigger type information is transmitted together with the holding information (Availability Indicator), the trigger type information may be included in the UEInformationResponse message to be transmitted to the E-UTRAN. That is, the trigger type information may be transmitted to the E-UTRAN together with the measurement data. In this way, the E-UTRAN is able to determine important measurement data or unimportant measurement data in consideration of a trigger when the radio terminal UE performed measurement.

In the aforementioned embodiment, the mobile communication system configured on the basis of LTE-Advanced was mainly described. However, the present invention can also be applied to a mobile communication system and the like configured on the basis of W-CDMA (Wideband Code Division Multiple Access), as well as the LTE-Advanced.

Furthermore, in the aforementioned embodiment, both the holding information (Availability Indicator) and the trigger type information are notified from the radio terminal UE to the radio base station eNB. However, the trigger type information may be allowed to have the function of the holding information, so that the holding information may not be necessary. For example, it is possible to employ a method in which notification of the trigger type information indicates the "presence" of measurement data and non-notification of the trigger type information indicates the "absence" of the measurement data. Alternatively, the holding information may be expanded to have the function of the trigger type information.

Thus, it must be understood that the present invention includes various embodiments that are not described herein.

In addition, the entire content of Japanese Patent Application No. 2010-231003 (filed on Oct. 13, 2010) is incorporated in the present specification by reference.

INDUSTRIAL APPLICABILITY

As described above, according to the radio measurement collection method, the radio terminal, and the radio base station of the present invention, it is possible for a network to easily collect important measurement data in the record-type MDT, so that the radio measurement collection method, the radio terminal, and the radio base station are available for radio communication such as mobile communication.

The invention claimed is:

1. A radio measurement collection method comprising:
a step of transmitting, by a network including a radio base station, a setup message including a measurement trigger to a radio terminal;
a step of setting, by the radio terminal, the measurement trigger included in the setup message received from the network in the radio terminal, and then performing radio environment measurement in response to the measurement trigger such that the measurement trigger of an event trigger type is prioritized over the measurement trigger of a periodical type and recording measurement data including a result of the measurement and location information in an idle state; and
a step of transmitting, by the radio terminal, the measurement data and trigger type information indicating a type of the measurement trigger to the network, wherein
the trigger type information indicates an event for initiating the radio environment measurement in the radio terminal.

2. The radio measurement collection method according to claim 1, wherein, in the step of transmitting the trigger type information, the radio terminal transmits the trigger type information to the network when the radio terminal is transitioned to a connected state from the idle state.

3. The radio measurement collection method according to claim 1, wherein, in the step of transmitting the trigger type information, the radio terminal transmits the trigger type information to the network in response to reception of a request message for requesting transmission of the measurement data from the network.

4. The radio measurement collection method according to claim 1, further comprising: a step of determining, by the network, whether to request the radio terminal to transmit the measurement data on the basis of the trigger type information from the radio terminal.

5. The radio measurement collection method according to claim 4, further comprising: a step of transmitting, by the network, a request message for requesting transmission of the measurement data to the radio terminal when it is determined to request the transmission of the measurement data in the step of determining.

6. A radio terminal comprising:
a receiver that receives a setup message including a measurement trigger from a network including a radio base station;
a memory that sets, to the radio terminal, the measurement trigger included in the setup message received in the receiver, and then performs radio environment measurement in response to the measurement trigger such that the measurement trigger of an event trigger type is prioritized over the measurement trigger of a periodical type and records measurement data including a result of the measurement and location information in an idle state; and
a transmitter that transmits the measurement data and trigger type information indicating a type of the measurement trigger to the network, wherein
the trigger type information indicates an event for initiating the radio environment measurement in the radio terminal.

7. The radio terminal according to claim 6, wherein, when the radio terminal is transitioned to a connected state from the idle state, the transmitter transmits the trigger type information together with holding information.

8. The radio terminal according to claim 6, wherein the transmitter transmits the trigger type information to the network in response to reception of a request message for requesting transmission of the measurement data in the receiver.

9. A radio base station comprising:
a transceiver that transmits, to a radio terminal, a setup message including a measurement trigger such that the measurement trigger of an event trigger type is prioritized over the measurement trigger of a periodical type; and
a receiver that receives, from the radio terminal, measurement data and trigger type information indicating the measurement trigger that is set in the radio terminal, wherein
the trigger type information indicates an event for initiating radio environment measurement in the radio terminal.

10. The radio base station according to claim 9, further comprising: a processor that determines whether to request the radio terminal to transmit measurement data including a measurement result of the radio environment and location information on the basis of the trigger type information received in the receiver.

11. The radio base station according to claim 9, further comprising: a transmitter that transmits a request message for requesting transmission of the measurement data to the radio terminal when it is determined to request the transmission of the measurement data.

* * * * *